United States Patent [19]

Kouwenhoven et al.

[11] 3,832,445
[45] Aug. 27, 1974

[54] SULFUR DIOXIDE REMOVAL

[75] Inventors: Herman W. Kouwenhoven; Franciscus W. Pijpers; Nicolaas Van Lookeren Campagne, all of Amsterdam, Netherlands

[73] Assignee: Shell Oil Company, New York, N.Y.

[22] Filed: May 7, 1971

[21] Appl. No.: 141,421

Related U.S. Application Data

[63] Continuation-in-part of Ser. No. 106,270, Jan. 13, 1971, abandoned, which is a continuation of Ser. No. 487,040, Sept. 13, 1965, abandoned.

[30] Foreign Application Priority Data
Sept. 14, 1964 Netherlands..................... 6410671

[52] U.S. Cl. ............................................... 423/244
[51] Int. Cl............................................. C01b 17/00

[58] Field of Search..................................... 423/244

[56] References Cited
UNITED STATES PATENTS
2,747,968  3/1956  Pigache............................. 423/244

Primary Examiner—Earl C. Thomas
Assistant Examiner—S. B. Shear
Attorney, Agent, or Firm—A. A. Jecminek

[57] ABSTRACT

Removing sulfur dioxide from an $SO_2$ and oxygen-containing gas by contacting the gas with a solid acceptor for $SO_2$ comprising supported cupric oxide at a temperature between 300 and 500°C and regenerating the solid acceptor by use of a reducing gas at temperatures within the same range as the acceptance temperature.

12 Claims, No Drawings

SULFUR DIOXIDE REMOVAL

CROSS-REFERENCE TO RELATED APPLICATIONS

This application is a continuation-in-part of copending U.S. application Ser. No. 106,270, filed Jan. 13, 1971 and now abandoned, which is a continuation of U.S. application Ser. No. 487,040, filed Sept. 13, 1965 and now abandoned.

BACKGROUND OF THE INVENTION

This invention relates to an improved process for removing sulfur dioxide from $SO_2$ and oxygen-containing gas mixtures such as flue gas.

Air pollution with sulfur dioxide is a major problem in the United States today. Sulfur dioxide is not only objectionable because of its extremely unpleasant odor but is also toxic in concentrations over about 10 parts per million, and is destructive to vegetation in concentrations of 1 part per million and lower. Sulfur dioxide and its oxidation product, sulfuric acid, are the principal cause of acidity in rain and fog which can in turn be very corrosive. The problem is indeed a large one; it was estimated in 1960 that 21 million tons per year of $SO_2$ were released to the atmosphere of the United States from combustion of fuel oil and coal. As a result of recent concern with smog and air pollution, increased legislation restricting the amounts of pollutants released to the atmosphere is expected. Accordingly, the present invention, which allows economic removal of $SO_2$ from gas mixtures on an industrial scale, is very desirable.

The U.S. Bureau of Mines has developed a process for the removal of $SO_2$ through the use of solid "acceptors" at flue gas temperatures. This process has distinct advantages over liquid absorption processes, which require excessive cooling of the gases which are ultimately discharged at low temperatures and remain near ground level, sometimes causing as much or more local pollution than the untreated flue gas. The Bureau of Mines process obviates these problems by effecting removal at flue gas temperatures, allowing ready dissipation of the stack gases into the upper atmosphere. This process is described in Bureau of Mines Report No. 5735 "Process Development in Removing Sulfur Dioxide from Hot Flue Gases," Part I, 1961, and in Bienstock et al., U.S. Pat. No. 2,992,884, issued July 18, 1961. This report describes a process wherein $SO_2$-containing gas is contacted at about 100°–500°C with a solid acceptor which is subsequently regenerated by contacting with a reducing gas such as hydrogen and/or carbon monoxide. Supported alkali metal compounds, for example, alkalized alumina, are used as acceptors.

U.S. Pat. No. 2,747,968 to Pigache discloses a dry process for the separation and recovery of sulfur-containing gases by contacting such gases with metal or metal oxides such as divided copper or copper oxide on a carrier at temperatures which may be below 100°C, but preferably are between 100° to 300°C. It is disclosed that when $SO_2$-containing gases are desulfurized at these temperatures copper sulfite is formed, and that regeneration can be effected by increasing the temperature to 350° to 850°C and passing an oxidizing gas such as air over the sulfur-containing fixing agent.

Other acceptors comprising alkaline metal supported by either iron or a combination of iron and antimony have also been described in the literature as in U.S. Pat. No. 3,411,865.

SUMMARY OF THE INVENTION

It has now been found that cupric oxide supported on a carrier material is an excellent acceptor for removing sulfur dioxide from $SO_2$ and oxygen-containing gases at very high temperatures, i.e., from 300° to 500°C. Under oxidative conditions, i.e., in the presence of oxygen and at the above-mentioned high temperatures, copper in the form of cupric oxide reacts with $SO_2$ with the resultant formation of copper sulfate. Further, it has been found that the loaded acceptor can be regenerated at substantially the same temperature as the acceptance temperature when the loaded acceptor is contacted with a reducing gas. The use of a chemical, rather than thermal, driving force to regenerate the copper sulfate-containing acceptor is very advantageous because it does not require large changes of temperature between the acceptance and regeneration steps, and vice versa as is the case with many conventional processes. Two temperature changes of large quantities of acceptor per cycle are not only very expensive, but also very destructive of the carrier.

Detailed Description of the Invention

It is essential to the practice of the invention that the cupric oxide acceptor be supported on carrier material. Suitable carriers are generally solids which are resistant to high temperatures and are not attacked by sulfur dioxide and other components found in most flue gases. These carriers are referred to in this context as "inert carriers." Suitable examples of these carriers are natural clays which may or may not be acid-pretreated, bauxite, alumina, boria, silica, silica-alumina, silica-magnesia, zeolites (both natural and synthetic), etc. Preferred carriers have a relatively large specific surface area for maximum contact area and high loading of the acceptor. The surface area should be at least 10 $m^2/g$ and preferably at least 100 $m^2/g$.

The copper content of the acceptor may vary within wide limits, depending largely upon the specific surface area of the carrier material. In general, it is preferred to have at least 1 percent wt, and preferably 5 to 15 percent wt, of copper calculated on the basis of the total catalyst composition. It is generally impractical to have a copper content higher than about 25 percent wt. The copper content of the acceptor is important, of course, since the copper combines in stoichiometric proportions with the sulfur dioxide in the flue gas.

It has also been found according to the invention that the presence of chromium oxide, palladium and/or silver in the acceptor promotes sulfur dioxide removal. When the promoter is present in the amount of about 0.1 to 10 percent by weight, calculated on the basis of the total acceptor, a higher degree of loading may be realized at the same operating temperature or, alternatively, lower temperatures may be used to achieve the same degree of loading. It has also been found that stability of the acceptors may be increased by inclusion of small quantities, for example, less than 5 percent and preferably 0.1 to 2 percent by weight of barium oxide.

The copper oxide-containing acceptor used in accordance with the process of the invention may be prepared by any known manner. For example, the inert carrier may be impregnated with solutions of copper salts and subsequently dried and calcined. Another known method is to mix the copper compound and carrier material intimately by means of coprecipitation and subsequently to dry and/or to calcine the mixture. Suitable preparation methods are further described in the examples below.

The process of the invention has two basic phases, acceptance, in which sulfur oxide reacts with the solid acceptor, and regeneration, wherein spent catalyst is prepared for reuse in the acceptance step. The acceptance step is effected by contacting a $SO_2$ and oxygen-containing gas with the acceptor in any known manner. The term "$SO_2$ and oxygen-containing gas" means any gas containing sulfur dioxide in air-poluting quantities and also containing sufficient oxygen to stoichiometrically combine with the $SO_2$ and cupric oxide to form copper sulfate upon contact with the solid acceptor. Examples of such gases include flue gas and Claus plant off-gas after incineration.

Acceptance proceeds under oxidative conditions in the presence of oxygen at temperatures between 300° and 500°C, preferably between 325° to 425°C. Under these conditions $SO_2$ is taken up in accordance with the general reaction $SO_2 + \frac{1}{2} O_2 + CuO \rightarrow CuSO_4$. The use of acceptance temperatures above 500°C is not desirable because of the reduced stability of the loaded acceptor at these high temperatures. Any appreciable decomposition of the copper sulfate with the resultant release of $SO_2$ or $SO_3$ into the purified gas during the acceptance run would, of course, defeat the purpose of the process. Acceptance at temperatures below 300°C under non-oxidative conditions is likewise undesirable since at such lower temperatures $SO_2$ would be bound to the acceptor predominantly as copper sulfite rather than in the requisite sulfate form. Moreover, in the treatment of hot gases, e.g., flue gas, the use of such lower temperatures would necessitate having to cool the gases prior to passing them into contact with the acceptor. In accordance with the present process, acceptance can be carried out by contacting the flue gas directly with the acceptor and then discharging it at essentially the same temperature through a stack, so that it maintains its buoyancy and passes into the upper atmosphere.

Contact may be made between the gases and acceptor in any known manner, for example, by passing gas through fixed, moving, or fluidized beds of acceptor particles. For continuous purification processes, parallel acceptance/regeneration reactors in swing operation or fluidized acceptor beds in which $SO_2$-containing gas is passed upward through a vertical reactor while fluid acceptor passes in a downward direction are preferred. With fluidized acceptor beds purified gases are removed from the top of the reactor, and loaded acceptor is discharged from the bottom of the reactor and continuously passed to a regenerator where it is contacted countercurrently with reducing gas. Regenerated acceptor is recycled continuously to the first reactor.

Regeneration is effected in the presence of a reducing gas at a temperature at or only slightly above the acceptance temperature, e.g., between 300° and 500°C, preferably between 350° and 450°C. At these temperatures and in the presence of a reducing gas, copper sulfate releases the bulk of the accpeted sulfur as $SO_2$.

$CuSO_4$ is outstanding in this respect because other relevant metal sulfates are normally reduced to their sulfides at temperatures of around 400°C. The low regeneration temperature of the acceptors of the invention is extremely advantageous from an operating viewpoint. First of all, operating at acceptance and regeneration temperatures which are substantially the same has a large effect on heat economy since intermediate heating and cooling of the acceptor is not necessary. The regenerating gas employed in the present process need not be a hot gas, and in fact no heat at all need be supplied to the reactor during regeneration. In contrast, substantial heat would be required to regenerate the loaded acceptor if the regeneration were accomplished thermally using an inert or oxidizing gas instead of the reducing gas employed in the present process. In addition, operation at a substantially constant temperature results in an important extension of acceptor life. It is clear that a long acceptor life is essential for economical operation of a process for removal of sulfur dioxide from flue gases because any adequate acceptor must be regenerated several hundred times without an appreciable activity decline. However, a long useful acceptor life is very difficult to realize if the acceptor must be heated and then cooled through a relatively wide temperature range for every regeneration and acceptance cycle, since the physcial and chemical stability of these acceptors may suffer considerable damage through this kind of temperature change. Wide temperature variations are not experienced in the process of the invention and therefore long acceptor life is realized. Thus, the present process offers distinct advantages in respect to very high heat efficiency as well as in preventing degradation of the acceptor due to the heat surge effects inherent in many previously proposed processes.

Two distinct stages are realized in the regeneration of loaded acceptors. In the first stage, the loaded acceptor is treated with a reducing gas to reduce the copper sulfate to cuprous oxide, metallic copper, and/or cuprous sulfide. The second stage of regeneration proceeds when the reduced material is contacted with oxygen-containing gas, such as air or the sulfur dioxide-containing gas to be purified. The second regeneration stage can be accomplished in a separate regeneration zone or in the acceptance zone during the early stages of the acceptance run. The second regeneration stage involves the following reactions:

$Cu_2O + \frac{1}{2} O_2 \rightarrow 2 CuO$
$Cu + \frac{1}{2} O_2 \rightarrow CuO$
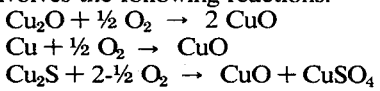

Suitable reducing gases for the regeneration step include hydrogen or hydrogen/carbon monoxide mixtures, and hydrocarbon or mixtures of hydrocarbons.

Examples of appropriate hydrocarbon gases are low molecular weight normally gaseous hydrocarbons such as methane, ethane, propane, and butane, or technical mixtures such as natural gas or tops obtained from straight-run distillation of petroleum.

Regeneration pressure is not critical; in general, atmospheric pressure is acceptable. Under certain operating conditions it may be advantageous to employ a regeneration temperature slightly higher than the acceptance temperature. This can be easily accomplished, if desired, by subjecting part of the reducing gas to partial combustion in the regeneration stage. Regenerator off-gas contains a high concentration of sulfur dioxide which may be disposed of in any known manner, such as conversion to elementary sulfur or sulfuric acid.

It has also been found that after a few acceptance-regeneration cycles, the copper-containing acceptors display an unexpectedly greater activity than the fresh acceptors for $SO_2$ removal.

The following examples are intended to illustrate the preparation of the acceptor and operation of the process of the invention.

EXAMPLE I

The acceptor was prepared as follows:

A commerical silica-alumina with an average grain diameter of 0.06 mm, a specific surface area of 408 $m^2/g$ and a pore volume of 0.50 ml/g, was impregnated with a saturated solution of copper nitrate in water, subsequently dried at 120°C and then calcined at 550°C in the presence of methane for 15 hours. The copper content of the acceptor thus prepared was 9 percent w.

This acceptor was used for the removal of sulfur dioxide from a synthetic flue gas having the following composition:

| | |
|---|---|
| $CO_2$ | 13.2%v |
| $O_2$ | 6.0%v |
| $N_2$ | 73.1%v |
| $H_2O$ | 5.4%v |
| $SO_2$ | 2.2%v |

The gas mixture was passed over the acceptor, which had been placed in a tubular reactor, at a temperature of 410°C. At the moment of breakthrough of sulfur dioxide, the acceptance was considered completed. After the acceptance-regeneration cycle the regenerated acceptor was used for another cycle. The results are summarized below.

TABLE I

| Acceptance | Cycle 1 | Cycle 2 |
|---|---|---|
| Temperature, °C | 410 | 410 |
| Space velocity, g $SO_2$/g acceptor-hour | 0.032 | 0.032 |
| Initial sulfur content of acceptor, %w | 0.0 | 0.3 |
| Sulfur content of acceptor, %w, at the moment when 99% of the $SO_2$ fed in has been combined | 2.5 | 3.5 |
| Breakthrough time, minutes | 96 | 115 |
| Regeneration Temperature, °C | 430 | 500 |
| Space velocity, g methane/g acceptor-hour | 4 | 4 |
| Sulfur regenerated, %w | 2.2 | 3.0 |
| Rate of regeneration, g sulfur/kg acceptor-hour | 21 | 31 |
| Quantity of acceptor, kg, required for combining 1 kg sulfur | 40 | 30 |

Comparison of the sulfur contents of the acceptor after the first and second periods of acceptance indicates that the activity of the acceptor has been increased through use. The regeneration effected in the second cycle at 500°C demonstrates that at a higher temperature, regeneration at a higher rate is possible. The rate of regeneration at 430°C is sufficient, however; at this temperature the time required for regeneration is shorter than that for acceptance, indicating that the reactor volume for the regenerator may be smaller than that for the acceptor.

EXAMPLE II

In the same manner as described in Example I two copper-containing acceptors were prepared using as carrier material gamma-alumina having a particle size of 0.5–1.4 mm, a specific surface area of 186 $m^2/g$ and a pore volume of 0.31 ml/g.

One of these acceptors (A) contained 14 parts by weight (pbw) copper to 100 pbw alumina, the other (B) contained, in addition, chromium oxide in the following composition: 14 pbw copper, 0.24 pbw chromium and 100 pbw alumina.

In the same manner as described in Example I these acceptors were contacted with synthetic flue gas with an $SO_2$ content of 0.5 percent v. The results are summarized in Table II.

Table II

| | Acceptor A | | Acceptor B | |
|---|---|---|---|---|
| Acceptance | Cycle 1 | Cycle 31 | Cycle 1 | Cycle 9 |
| Temperature, °C | 305 | 305 | 305 | 305 |
| Space velocity, g $SO_2$/g acceptor-hour | 0.033 | 0.033 | 0.041 | 0.041 |
| Initial sulfur content of acceptor, %w | 0 | 0 | 0 | 0 |
| Sulfur content of acceptor, %w, at the moment when 99% of the $SO_2$ fed in has been combined | 1.65 | 1.7 | 1.3 | 2.5 |
| Breakthrough time, min | 58 | 60 | 39 | 90 |
| Regeneration Temperature, °C | 400 | 400 | 400 | 400 |
| Space velocity, g propane/g acceptor-hour | 0.11 | 0.11 | 0.11 | 0.11 |
| Rate of regeneration, g sulfur/kg acceptor-hour | 8 | 29 | 9 | 31 |
| Quantity of acceptor, kg, required for combining 1 kg sulfur | 60 | 60 | 70 | 40 |

EXAMPLE III

In the same manner as described in Example I an acceptor containing copper, chromium and barium was prepared using as carrier material silica-alumina having a particle size of 0.84–1.6 mm, a specific surface area of 159 $m^2/g$ and a pore volume of 0.28 ml/g.

The composition of the ready acceptor was: 18 pbw copper, 5 pbw chromium, 0.5 pbw barium and 100 pbw silica-alumina (87 percent silica and 13 percent alumina).

To determine the effect of acceptor age on activity, this acceptor was used for a total of 418 acceptance-regeneration cycles. The acceptor was regenerated with methane. The results are summarized in Table III.

Table III

| Acceptance | Cycle 35 | Cycle 170 | Cycle 418 |
| --- | --- | --- | --- |
| Temperature, °C | 335 | 335 | 335 |
| Space velocity, Nl/kg acceptor-hour | 1350 | 1350 | 1350 |
| $SO_2$ in flue gas, %v | 2.2 | 2.2 | 2.2 |
| Duration of acceptance, min | 286 | 86 | 86 |
| $SO_2$ load, kg/ton, at the moment when 90% of the $SO_2$ fed in has been combined | 45 | 31 | 31 |
| Regeneration | | | |
| Temperature, °C | 430 | 430 | 430 |
| Duration of regeneration, min | 86 | 86 | 86 |
| Balance of $SO_2$, % on feed | 93 | 98 | 97 |

EXAMPLE IV

This example serves to demonstrate the effect of different types of promoter materials.

In the same manner as described in Example I four acceptors were prepared, using copper oxide on gamma-alumina as carrier material. Two of these acceptors were identical with acceptors A and B from Example II, the other two containing as promoters silver (C) and palladium (D) respectively, both in the form of the metal.

The four acceptors were contacted with synthetic flue gas with an $SO_2$ content of 0.5 percent by volume and subsequently regenerated with propane. In all cases the acceptance was carried out at a temperature of 300°C and the regeneration with propane at a temperature of 400°C.

The following table illustrates the improvement, resulting from the incorporation of promoter materials, both in the maximum obtainable load, expressed as percent by weight of $SO_2$ on the acceptor, and in the average regeneration rate, expressed as percent by weight of $SO_2$ per hour.

Table IV

| Acceptor composition p.b.w. | A | B | C | D |
| --- | --- | --- | --- | --- |
| $Al_2O_3$ | 100 | 100 | 100 | 100 |
| Cu | 14 | 14 | 14 | 14 |
| Cr | — | 0.24 | — | — |
| Ag | — | — | 0.56 | — |
| Pd | — | — | — | 0.50 |
| Load, %w of $SO_2$ | 4.9 | 7.9 | 6.7 | 12.6 |
| Regeneration rate, %w $SO_2$ per hour | 2.2 | 4.0 | 2.8 | 5.3 |
| Number of cycles tested | 31 | 9 | 31 | 31 |

We claim as our invention:

1. A process for removing $SO_2$ from a $SO_2$- and oxygen-containing gas which comprises
   A. contacting the gas at a temperature between 325° and 425°C with a solid acceptor comprising 1 to about 25 percent by weight of copper in the form of cupric oxide supported on a carrier, whereby sulfur oxide is removed from said gas by reaction with the cupric oxide to form copper sulfate,
   B. regenerating the resultant loaded solid acceptor by terminating contact with the $SO_2$ and oxygen-containing gas, and then contacting the loaded acceptor with a reducing gas at a temperature between 300° and 500°C whereby $SO_2$ is released and cuprous or metallic copper are formed,
   C. returning the regenerated acceptor into contact with said $SO_2$-and oxygen-containing gas.

2. The process of claim 1 wherein the reducing gas comprises hydrogen, carbon monoxide, a normally gaseous hydrocarbon, or mixtures thereof, and the $SO_2$ and oxygen-containing gas is flue gas.

3. The process of claim 1 wherein regeneration is effected at a temperature between 350° and 450°C.

4. The process of claim 1 wherein the regenerated acceptor is oxidized to contain cupric oxide before returning it into contact with the $SO_2$ and oxygen-containing gas.

5. The process of claim 3 wherein the reducing gas comprises a methane/hydrogen mixture.

6. The process of claim 3 wherein the reducing gas comprises a carbon monoxide/hydrogen mixture.

7. The process of claim 3 wherein the copper content of the solid acceptor is from 5 to 15 percent by weight.

8. The process of claim 7 wherein the carrier is natural clay, bauxite, alumina, chromia, boria, silica, silica-magnesia silica-alumina or zeolite having a surface area of at least 100 m²/g.

9. The process of claim 1 wherein acceptance and regeneration are accomplished at substantially the same temperature.

10. The process of claim 1 wherein the solid acceptor contains from 0.1 to 10 percent by weight palladium.

11. The process of claim 1 wherein the acceptor contains from 0.1 to 10 percent by weight silver.

12. The process of claim 7 wherein the carrier is alumina.

* * * * *